United States Patent [19]
Veenstra

[11] Patent Number: 6,109,380
[45] Date of Patent: Aug. 29, 2000

[54] ELECTRIC VEHICLE VERTICAL WALL CONSTRUCTION BATTERY TRAY

[75] Inventor: Michael Jon Veenstra, Allen Park, Mich.

[73] Assignee: Ford Global Technologies, Inc., Dearborn, Mich.

[21] Appl. No.: 09/058,795

[22] Filed: Apr. 13, 1998

[51] Int. Cl.⁷ .............................. B60R 16/04; H01M 2/10
[52] U.S. Cl. .............................................. 180/68.5; 429/99
[58] Field of Search .............................. 180/68.5; 429/99, 429/100, 96, 120

[56] References Cited

U.S. PATENT DOCUMENTS

| | | | |
|---|---|---|---|
| 3,982,963 | 9/1976 | Mahoney et al. | 429/120 |
| 4,883,725 | 11/1989 | Gerard . | |
| 5,015,545 | 5/1991 | Brooks | 429/120 |
| 5,114,207 | 5/1992 | Nakajima et al. . | |
| 5,378,555 | 1/1995 | Waters et al. | 429/99 |
| 5,392,873 | 2/1995 | Masuyama et al. . | |
| 5,437,939 | 8/1995 | Beckley . | |
| 5,441,123 | 8/1995 | Beckley . | |
| 5,558,949 | 9/1996 | Iwatsuki et al. . | |
| 5,626,982 | 5/1997 | Kawai et al. | 429/120 |
| 5,639,571 | 6/1997 | Waters et al. . | |
| 5,948,298 | 9/1999 | Ijaz | 180/68.5 |

*Primary Examiner*—Kevin Hurley
*Assistant Examiner*—Jeff Restifo
*Attorney, Agent, or Firm*—David B. Kelley; Roger L. May

[57] ABSTRACT

An electric vehicle battery tray includes a base having an inner surface and an outer surface, a front and back wall having outer and inner surfaces adapted to overlay the base outer surface and to create substantially planar, vertical front and back wall inner surfaces thereby, and a left and right side wall having outer and inner surfaces adapted to longitudinally overlay the base outer surface and to create substantially planar, vertical left and right side wall inner surfaces thereby.

20 Claims, 4 Drawing Sheets

ELECTRIC VEHICLE VERTICAL WALL CONSTRUCTION BATTERY TRAY

FIELD OF THE INVENTION

The present invention relates to electric vehicle battery trays, and more specifically, to a vertical wall construction for such trays.

BACKGROUND OF THE INVENTION

Conventional electric vehicle battery trays must support a plurality of batteries, which cumulatively can weigh as much as 1,700 pounds. As a result of such load bearing requirements, battery trays tend to be of a stamped metal construction. Such battery tray constructions, however, have the problem of adding weight to the vehicle as well being susceptible to corrosion.

Attempts have been made to design a polymer based battery tray to take advantage of the light weight and corrosion resistant qualities of certain plastics. Injection molding is one method that may be used to manufacture such a tray. Such a molding technique, however, requires a draft angle of 4 to 7 degrees in order to remove the tray from the core of the tool. This results in the upper wall of the tray extending a substantial distance outward of the battery pack. Any such distance is a liability to an automotive designer that has limited packaging space.

A problem associated with both metal and polymer constructed battery trays is how the trays may be employed to assist in maximizing battery life. One variable that directly impacts battery life is the thermal conductivity of the tray. Controlling the thermal conductivity of the battery pack via the battery tray enhances battery pack life.

What is desired, therefore, is a polymeric battery tray sufficiently strong to house an electric vehicle battery pack while minimizing packaging space and maximizing thermal conductivity control.

SUMMARY OF THE INVENTION

Responsive to the deficiencies in the prior art, the present invention provides an electric vehicle battery tray including a base having an inner surface and an outer surface, a front and back wall having outer and inner surfaces adapted to overlay the base outer surface and to create substantially planar, vertical front and back wall inner surfaces thereby, and a left and right side wall having outer and inner surfaces adapted to longitudinally overlay the base outer surface and to create substantially planar, vertical left and right side wall inner surfaces thereby.

In a preferred embodiment of the present invention the front, back, left side, and right side wall inner and outer surfaces are spaced a predetermined distance to form cavities therebetween. The cavities are filled with a thermal insulation core material, preferably low density urethane foam.

An object of the present invention is to provide an electric vehicle battery tray, which minimizes packaging space and maximizes thermal conductivity control.

An advantage of the present battery tray is to overlay the base with vertical front, back, left side, and right side walls and form vertical inner surfaces thereby. Vertical inner surfaces minimizes the packaging space required for the battery tray and would be impossible to accomplish, by conventional injection molding processes, with a one piece battery tray. Further, spacing the inner and outer surfaces of the walls and providing an insulating material in the cavity formed therebetween maximizes thermal conductivity control, thereby maximizing battery life.

BRIEF DESCRIPTION OF THE DRAWINGS

Other features and advantages of the present invention will become apparent to those skilled in the automotive vehicle body related arts upon reading the following description with reference to the accompanying drawings, in which.

DETAILED DESCRIPTION OF THE PREFERRED EMBODIMENT

Figure 1:
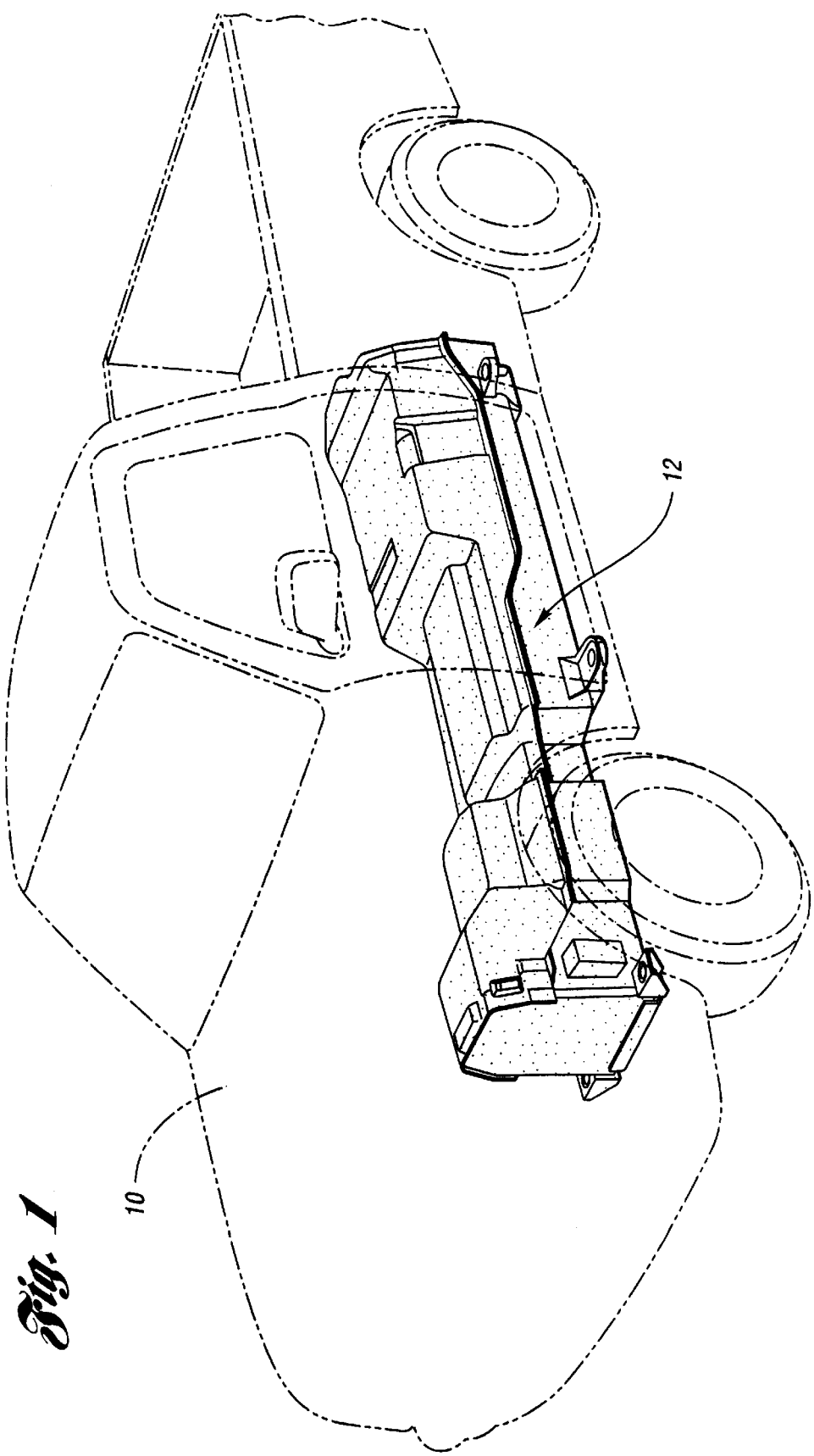
FIG. 1 is a perspective view of an automotive vehicle with a battery tray according to the present invention.
Figure 2:
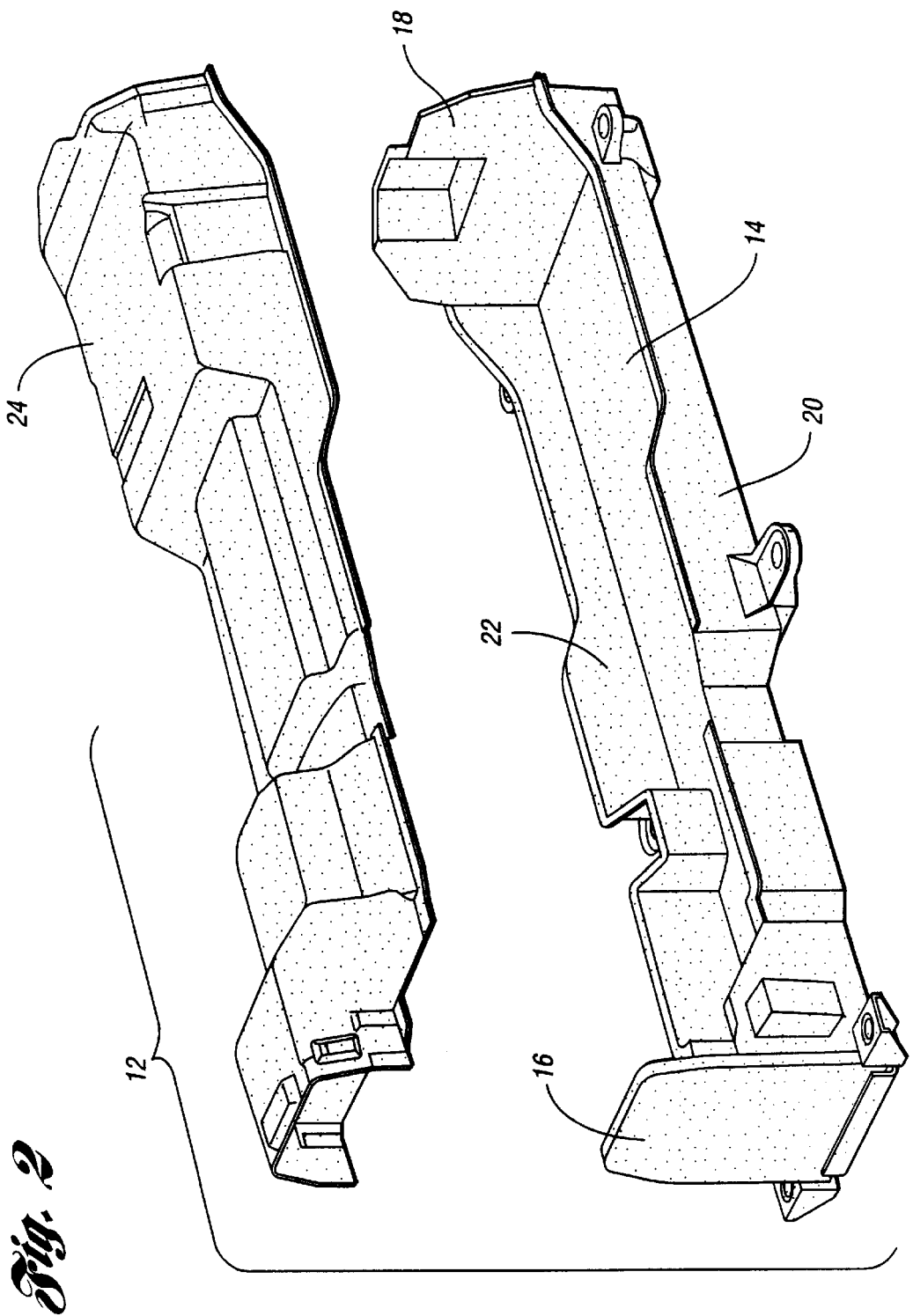
FIG. 2 is a perspective view of a battery tray and a cover therefore according to the present invention.
Figure 3:
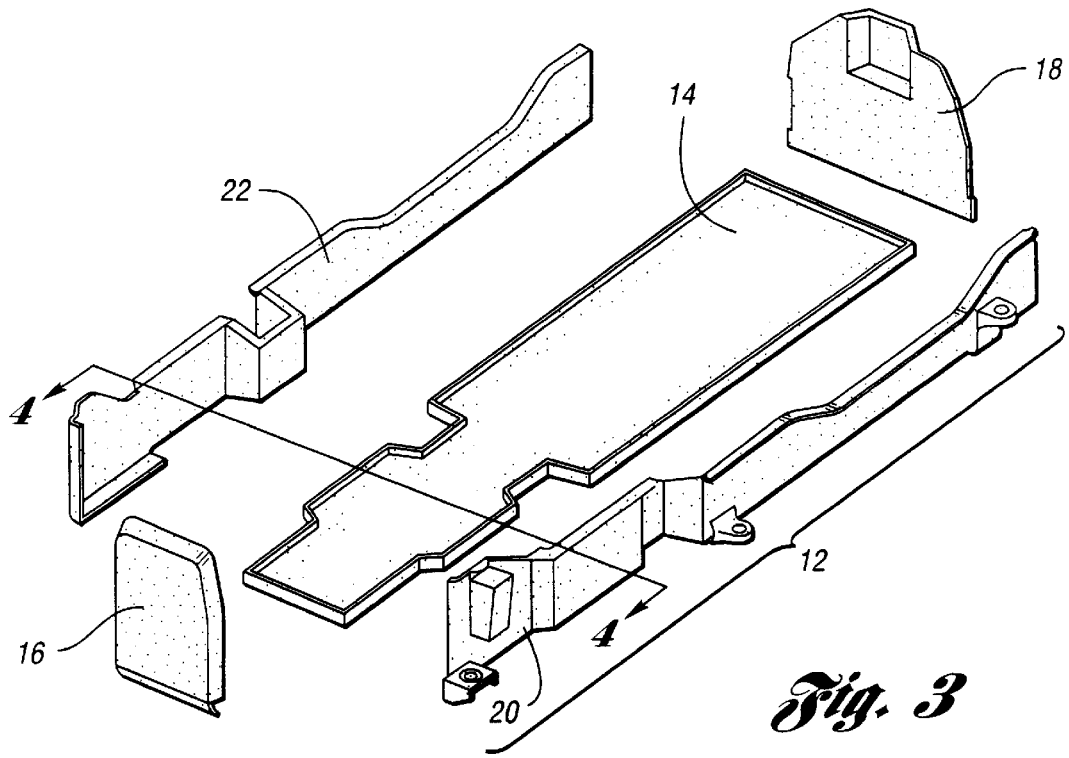
FIG. 3 is a perspective, exploded view of battery tray according to the present invention.
Figure 4:
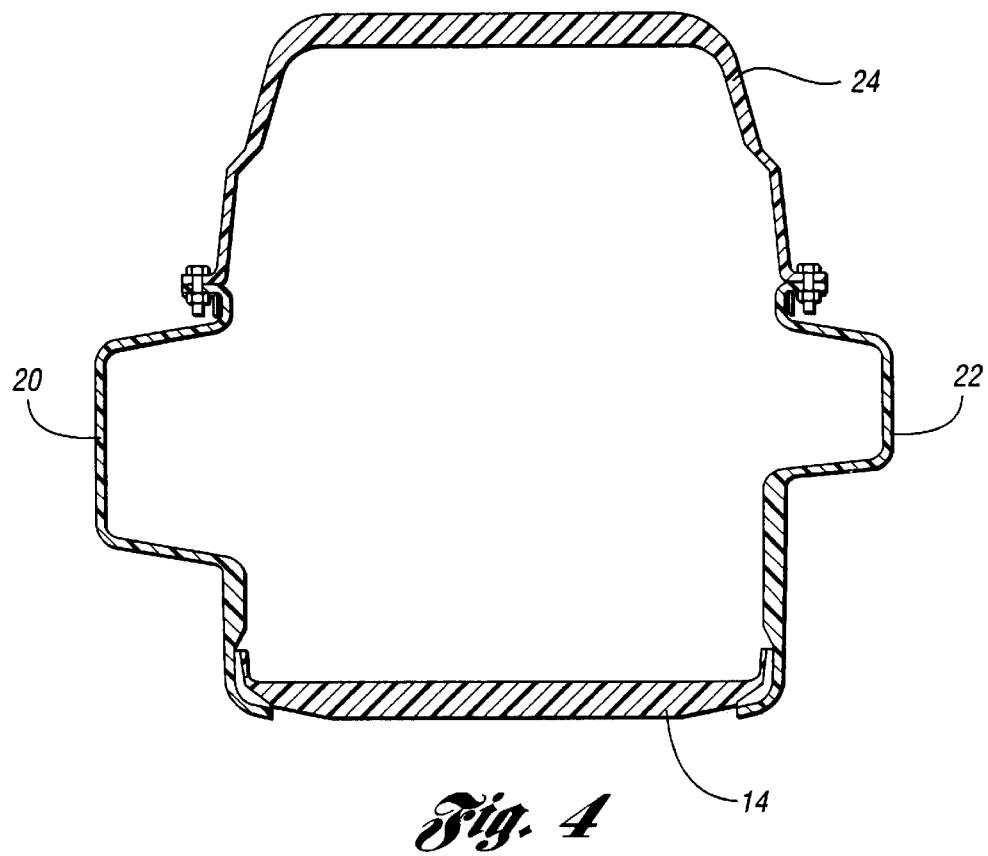
FIG. 4 is a cross-sectional view taken along the line 4—4 of FIG. 3 of a battery tray according to the present invention.

Turning now to the drawings, and in particular to FIG. 1 thereof, an electric automotive vehicle 10 is shown having a longitudinally disposed battery tray 12. The battery tray 12 may house a plurality of lead acid batteries or any other type of battery without departing from the scope of the present invention. As shown in FIGS. 2 and 3, the tray 12 has a base 14, a front wall 16, a back wall 18, a left side wall 20, a right side wall 22, and a cover 24. As shown in FIG. 4, the cover 24 is fastened to the left and right side walls, 20 and 22 respectively, in conventional fashion to form a substantially hermetically sealed inner environment. The walls of the tray 12 may be manufactured by an injection molding process, but are preferably manufactured by a resin transfer molding process, as known in the art. Preferably the walls are formed of a vinyl ester resin with a forty percent glass fiber mat, but other polymers may be utilized without departing from the scope of the present invention. The walls are preferably adhered to each other with Ashland Pliogrip structural adhesive.

Figure 5:
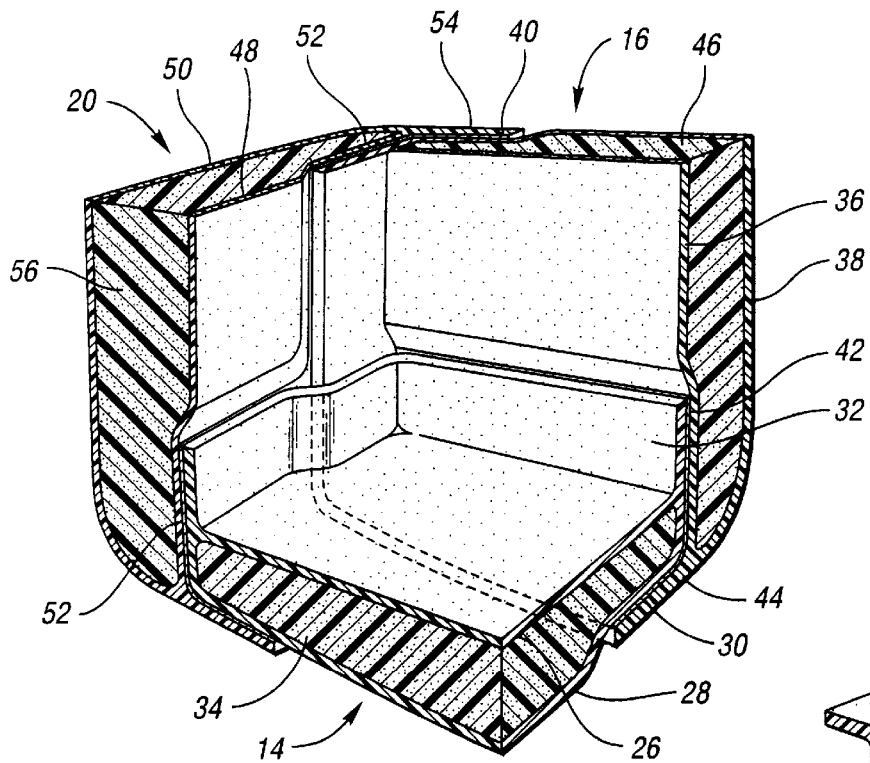
FIG. 5 is an internal, perspective view of a corner, overlap structure of a battery tray according to the present invention.

Referring to FIG. 5, an inner left front corner of the tray 12 shows the relationship of the left wall 20, front wall 16, and base 14. The relationships of the right wall 22, front wall 16 and base 14 as well as the left 20 and right walls 22, back wall 18, and base are considered to be mirror images of the following description. In other words, the front wall 16 is considered to be a mirror image of the back wall 18 and the left wall 20 is considered to be a mirror image of the right wall 22.

As shown in FIG. 5, the base 14 is horizontal and has an inner surface 26 and an outer surface 28. In the region of the front end of the base 14 the outer surface 28 has an indented or stepped portion 30. The base inner surface 26 has, about the perimeter, a perpendicularly projecting, vertical flange 32. The base inner surface 26 is spaced a predetermined distance from the base outer surface 28 to form a cavity 34 therebetween. The cavity 34 is preferably filled with a high shear strength core material such as balsa.

Figure 6:
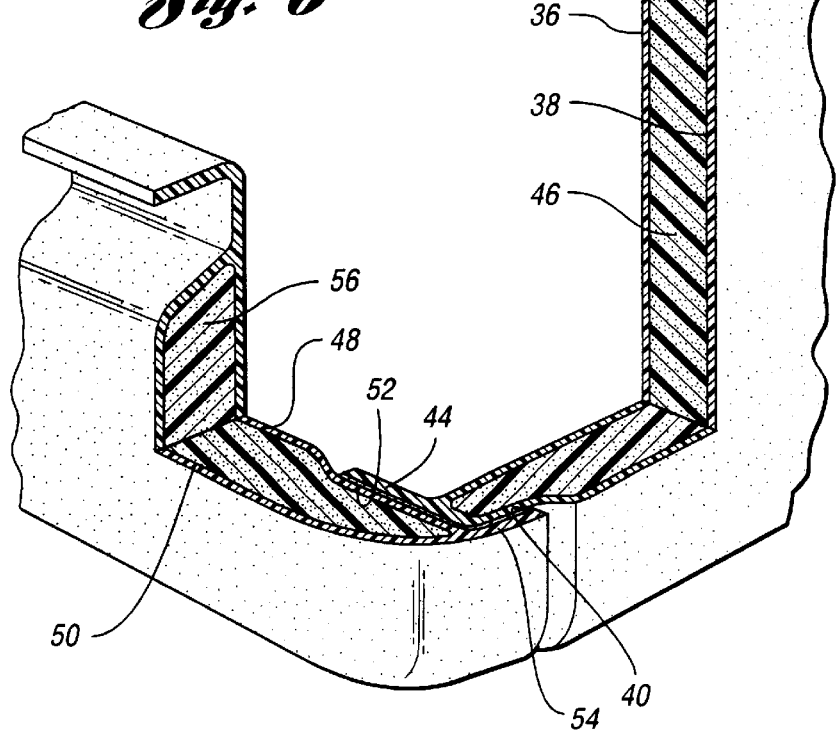
FIG. 6 is an external, perspective view of a corner, overlap structure of a battery tray according to the present invention.

As further shown in FIG. 5, the front wall 16 is vertical and has an inner surface 38 and an outer surface 38. The front outer surface 36 has a lateral indented or stepped portion 40, as also shown in FIG. 6. The front inner surface 36 also has an indented or stepped portion 42. The stepped portion 42 receives the base vertical flange 32 to create a planar vertical outer front wall surface 36 thereby. The front inner surface 38 further has a longitudinally extending flange 44. The flange 44 overlays the base outer surface stepped portion 30 to create a substantially planar, base outer surface 28. The front inner surface 36 is spaced a predetermined distance from the front outer surface 38 to form a cavity 46 therebetween. The cavity 46 is preferably filled with a thermal insulation core material such as low density urethane foam.

As shown in FIGS. 5 and 6, the left wall 20 is vertical and has an inner surface 48 and an outer surface 50. The left inner surface 48 has an indented or stepped portion 52. The stepped portion 42 receives the base vertical flange 32 and the front longitudinal flange 44 to create a planar vertical inner left wall surface thereby. The left inner surface 48 further has a laterally extending flange 54. The flange 54 overlays the front outer surface stepped portion 40 and the base outer surface 28 to create a substantially planar, front outer surface 38 and a substantially planar, base outer surface 28. The left inner surface 48 is spaced a predetermined distance from the left outer surface 50 to form a cavity therebetween. The cavity 56 is preferably filled with a thermal insulation core material such as low density urethane foam.

The described structure is advantageous because the base flange 32, being received by the front inner and left side stepped surfaces, 42 and 52 respectively, forms vertical inner surfaces thereby. The vertical inner surface minimizes the packaging space required for the battery tray, and would be impossible to accomplish by conventional manufacturing processes with a one piece battery tray. Further, spacing the inner and outer surfaces of the walls and providing an insulating material in the cavity formed therebetween, maximizes thermal conductivity control and thereby maximizes battery life.

Only one embodiment of the electric vehicle battery tray of the present invention has been described. Those skilled in the automotive body arts will appreciate that others may be possible without departing from the scope of the following claims.

I claim:

1. An electric vehicle battery tray, comprising:
    a base having a front end, a back end, an inner surface, and an outer surface;
    a front wall having an outer surface and an indented inner surface adapted to longitudinally overlay the base front end and to create a substantially planar, vertical front wall inner surface thereby,
    a back wall having an outer surface and an indented inner surface adapted to longitudinally overlay the base back end and to create a substantially planar, vertical back wall inner surface thereby;
    a left side wall having an outer surface and an indented inner surface adapted to longitudinally overlay the base outer surface and to create a substantially planar, vertical left side wall inner surface thereby; and
    a right side wall having an outer surface and an indented inner surface adapted to longitudinally overlay the base outer surface and to create a substantially planar, vertical right side wall inner surface thereby.

2. An electric vehicle battery tray according to claim 1, wherein:
    the base inner and outer surfaces are spaced a predetermined distance to form a cavity therebetween.

3. An electric vehicle battery tray according to claim 2, wherein:
    the cavity is filled with a high shear strength core material.

4. An electric vehicle battery tray according to claim 3, wherein:
    the high shear strength core material is balsa.

5. An electric vehicle battery tray according to claim 1, wherein:
    the front, back, left side, and right side wall inner and outer surfaces are spaced a predetermined distance to form a cavity therebetween.

6. An electric vehicle battery tray according to claim 5, wherein:
    each of the cavities of the front, back, left side and right side wall is filled with a thermal insulation core material.

7. An electric vehicle battery tray according to claim 1, wherein:
    the base, front, back, left side, and right side walls are polymeric and formed by a resin transfer molding process.

8. An electric vehicle battery tray according to claim 7, wherein:
    the polymeric material is a vinyl ester resin with a forty percent continuous glass fiber mat.

9. An electric vehicle battery tray, comprising:
    a horizontal base having a front end, a back end, an inner surface, and an outer surface;
    a vertical front wall having an outer surface and an inner surface adapted to overlay the base front end and to create a substantially planar, vertical front wall inner surface thereby,
    a vertical back wall having an outer surface and an inner surface adapted to overlay the base back end and to create a substantially planar, vertical back wall inner surface thereby;
    a vertical left side wall having an outer surface and an inner surface adapted to longitudinally overlay the base, front wall, and back wall outer surfaces and to create a substantially planar, vertical left side wall inner surface and a substantially planar vertical front and back wall outer surface thereby; and
    a vertical right side wall having an outer surface and in inner surface adapted to longitudinally overlay the base, front wall, and back wall outer surfaces and to create a substantially planar, vertical right side wall inner surface and a substantially planar vertical front and back wall outer surface thereby, each wall being adhered to the base.

10. An electric vehicle battery tray according to claim 9, wherein:
    the base inner and outer surfaces are spaced a predetermined distance to form a cavity therebetween.

11. An electric vehicle battery tray according to claim 10, wherein:
    the cavity is filled with a high shear strength core material.

12. An electric vehicle battery tray according to claim 11, wherein:
    the high shear strength core material is balsa.

13. An electric vehicle battery tray according to claim 12, wherein:
    the front, back, left side, and right side wall inner and outer surfaces are spaced a predetermined distance to form a cavity therebetween.

14. An electric vehicle battery tray according to claim 13, wherein:

each of the cavities in the front, back, left side and right side walls is filled with a thermal insulation core material.

15. An electric vehicle battery tray according to claim 14, wherein:

the thermal insulation core material is low density urethane foam.

16. An electric vehicle battery tray according to claim 9, wherein:

the base, front, back, left side, and right side walls are polymeric and formed by an injection molding process.

17. An electric vehicle battery tray according to claim 9, wherein:

the base, front, back, left side, and right side walls are polymeric and formed by a resin transfer molding process.

18. An electric vehicle battery tray, comprising:

a horizontal base having a front end, a back end, an outer surface with indented front and back portions adapted to receive front rear wall flanges to create a substantially planar outer surface thereby, and an inner surface with a perpendicularly projecting, vertical flange about the perimeter;

a vertical front wall having an outer surface with an indented portion adapted to receive left and right side wall flanges and an inner surface with a longitudinally extending flange adapted to engage the base front end indented portion and an indented portion adapted to receive a portion of the base front end vertical flange to create a substantially planar, vertical inner front surface thereby;

a vertical back wall having an outer surface with an indented portion adapted to receive left and right side wall flanges to create a substantially planar outer surface thereby and an inner surface with a longitudinally extending flange adapted to engage the base back end indented portion and an indented portion adapted to receive a portion of the base back end vertical flange to create a substantially planar, vertical inner back surface thereby;

a vertical left side wall having an outer surface and an inner surface with a laterally extending flange adapted to engage the front and back wall outer surface indented portions to create a substantially planar outer surface thereby and an indented portion adapted to receive a portion of the base vertical flange and front and back wall longitudinal flanges to create a substantially planar, vertical inner left surface thereby; and a vertical right side wall having an outer surface and an inner surface with a laterally extending flange adapted to engage front and back wall outer surface indented portions to create a substantially planar outer surface thereby and an indented portion adapted to receive a portion of the base vertical flange and front and back wall longitudinal flanges to create a substantially planar, vertical inner right surface thereby.

19. An electric vehicle battery tray according to claim 1, further comprising a cover which is securable to at least one of the walls.

20. An electric vehicle battery tray according to claim 1, wherein each of the walls are adhered to the base.

* * * * *